United States Patent
Theurich et al.

(10) Patent No.: US 12,399,080 B2
(45) Date of Patent: Aug. 26, 2025

(54) METHOD, DEVICE, AND GRAPHICAL USER INTERFACE FOR ANALYSING A MECHANICAL OBJECT

(71) Applicant: MTU Aero Engines AG, Munich (DE)

(72) Inventors: Daniel Theurich, Munich (DE); Michael Junge, Munich (DE)

(73) Assignee: MTU Aero Engines AG, Munich (DE)

( * ) Notice: Subject to any disclaimer, the term of this patent is extended or adjusted under 35 U.S.C. 154(b) by 436 days.

(21) Appl. No.: 17/794,975

(22) PCT Filed: Jan. 27, 2021

(86) PCT No.: PCT/DE2021/000012
§ 371 (c)(1),
(2) Date: Jul. 24, 2022

(87) PCT Pub. No.: WO2021/151410
PCT Pub. Date: Aug. 5, 2021

(65) Prior Publication Data
US 2023/0068226 A1   Mar. 2, 2023

(30) Foreign Application Priority Data
Jan. 27, 2020   (DE) .................. 10 2020 200 936.8

(51) Int. Cl.
*G01M 13/00*    (2019.01)
*G01M 15/12*    (2006.01)
(52) U.S. Cl.
CPC ............ *G01M 13/00* (2013.01); *G01M 15/12* (2013.01)

(58) Field of Classification Search
CPC ........ G01N 29/00; G01N 29/14; G01N 29/46; G01N 2291/014; G01M 13/045;
(Continued)

(56) References Cited

U.S. PATENT DOCUMENTS

| 5,152,172 A | 10/1992 | Leon et al. |
| 5,541,857 A | 7/1996 | Walter et al. |

(Continued)

FOREIGN PATENT DOCUMENTS

| CN | 109682562 A | 4/2019 |
| DE | 602005000204 T2 | 9/2007 |

(Continued)

OTHER PUBLICATIONS

McLaughlin, J. R. (1998). Good Vibrations: A membrane's properties can now be obtained by analyzing nodes—places where the system is at rest when vibrated at a natural frequency. American Scientist, 86(4), 342-349. http://www.jstor.org/stable/27857058 (Year: 1998).*

(Continued)

*Primary Examiner* — Huy Q Phan
*Assistant Examiner* — Martin Walter Braunlich
(74) *Attorney, Agent, or Firm* — Hinckley, Allen & Snyder, LLP; David Josephs

(57) ABSTRACT

The disclosure is directed to a method comprising the steps: carrying out multiple measurements on a mechanical object, the measurements each differing by one or more parameters influencing the measurement; determining a spectrogram on the basis of the measurement data of the measurements and depending on a predefined parameter of the mechanical object; determining one or more excitations of the mechanical object; reproducing the excitations in the spectrogram.

13 Claims, 2 Drawing Sheets

(58) Field of Classification Search
CPC .............................. G01M 15/12; G01M 5/0066; G01M 13/028; G01H 1/006; G01H 1/003; G01H 1/00; G01H 1/06; G01H 1/08; G01H 1/10

See application file for complete search history.

(56) References Cited

U.S. PATENT DOCUMENTS

| | | | | |
|---|---|---|---|---|
| 5,825,657 | A * | 10/1998 | Hernandez | G01M 13/028 |
| | | | | 702/182 |
| 6,918,747 | B2 | 7/2005 | Comperat et al. | |
| 7,654,145 | B2 | 2/2010 | Twerdochilib | |
| 9,032,803 | B2 * | 5/2015 | Griffaton | G01M 13/045 |
| | | | | 702/56 |
| 9,212,946 | B2 | 12/2015 | Grant et al. | |
| 9,395,270 | B2 | 7/2016 | Czerniak et al. | |
| 9,557,210 | B2 | 1/2017 | Rao | |
| 2008/0223135 | A1 | 9/2008 | Blanchard et al. | |
| 2009/0301055 | A1 * | 12/2009 | Kallappa | F01D 21/003 |
| | | | | 73/660 |
| 2014/0180606 | A1 * | 6/2014 | Anuzis | G01M 15/14 |
| | | | | 702/39 |
| 2016/0054171 | A1 | 2/2016 | Maalouf | |
| 2017/0315516 | A1 | 11/2017 | Kozionov et al. | |
| 2018/0011065 | A1 | 1/2018 | Bowers et al. | |
| 2021/0140925 | A1 * | 5/2021 | Bell | G06N 5/047 |
| 2023/0213485 | A1 * | 7/2023 | Schönenborn | F01D 5/34 |
| | | | | 73/579 |

FOREIGN PATENT DOCUMENTS

| | | |
|---|---|---|
| DE | 102008052373 A1 | 4/2010 |
| DE | 102009010375 A1 | 9/2010 |
| EP | 0654163 A1 | 5/1995 |
| EP | 0988583 B1 | 2/1999 |
| EP | 2546619 A1 | 1/2013 |
| EP | 2613131 A2 | 7/2013 |
| EP | 2199764 B1 | 9/2018 |
| FR | 2858690 A1 | 2/2005 |
| JP | H11-14446 A | 1/1999 |
| JP | 2018138909 A | 9/2018 |
| WO | 2007071912 A2 | 6/2007 |
| WO | 2014184657 A1 | 11/2014 |

OTHER PUBLICATIONS

Ma, Z., Teng, W., Liu, Y., Wang, D. and Kusiak, A. (2017), Application of the multi-scale enveloping spectrogram to detect weak faults in a wind turbine gearbox. IET Renewable Power Generation, 11: 578-584. https://doi.org/10.1049/iet-rpg.2016.0722 (Year: 2017).*

* cited by examiner

METHOD, DEVICE, AND GRAPHICAL USER INTERFACE FOR ANALYSING A MECHANICAL OBJECT

BACKGROUND OF THE INVENTION

Disclosed below are embodiments that relate to a method and a device for analyzing a movement behavior of a mechanical object, such as, for example, for analyzing a vibration behavior of an integrally manufactured blade disk. Further disclosed are graphical user interfaces that are set up for displaying and/or configuring one of the disclosed methods for analyzing a movement behavior of a mechanical object.

The measurement of mechanical objects, such as, for example, of compressor disks for turbines, can be produced traditionally by excitation of the object, which triggers a mechanical response of the object that can be detected as a time-dependent signal by measurement technology. In order to determine the mechanical properties of the object, such as, for example, the mass thereof, the damping thereof, and/or the natural frequencies and vibrational modes thereof, the time signal can be transformed into the frequency range and hence a corresponding transform function can be laid out, which, in turn, as a model, then makes it possible to obtain information on the properties of the mechanical object and to simulate them. A measuring device for such a method is disclosed in DE 102009010375 A1.

The Campbell diagram is used traditionally for illustrating the vibrational properties of a mechanical system. In this diagram, the natural frequencies of the mechanical system are plotted versus a rotational speed, such as, for example, the rotational speed of a rotating mechanical system part. In addition, the excitations acting on the system are also plotted. Critical resonance frequencies are found where a natural frequency and an excitation coincide.

However, a mechanical system, such as, for example, a turbine compressor disk consists of a number of parts and, in operation, exhibits a complicated vibrational behavior, which is dependent on various ambient parameters. The Campbell diagram can routinely reproduce only a part of such a complicated vibration behavior.

SUMMARY OF THE INVENTION

In this respect, the problem ensues of improving the analysis of a movement behavior of a mechanical object.

This problem is solved by the invention defined by the subjects of the independent claims. The dependent claims relate to corresponding further developments. Disclosed below are various aspects and embodiments of these aspects, which provide additional features and advantages.

Some embodiments solve the problem of integrating various measurements in a diagram. To this end, various measurements, each of which differs in terms of individual parameters, are fused into a set of data and reproduced in a spectrogram. It is then possible to superimpose on the fused measurement values in the spectrogram further additional information, such as, for example, analytically calculated natural frequencies or analytically calculated excitation frequencies. An effective analysis of the vibration behavior of a mechanical object is thereby made possible.

A first aspect relates to a method, comprising the steps:
carrying out multiple measurements on a mechanical object, the measurements each differing by one or more parameters influencing the measurement;
determining a spectrogram on the basis of the measurement data of the measurements and depending on a predefined parameter of the mechanical object, in particular in order to select between various measurements;
determining one or more excitations of the mechanical object;
reproducing the excitations in the spectrogram.

A mechanical object can be, in particular, a disk or a disk-shaped object, which, in particular, can be unbalanced. In particular, a mechanical object can be made of a metal or of a plastic. In particular, a mechanical object can comprise a metal or a plastic. A mechanical object can be, in particular, a part of a turbine or of a turbocharger. In particular, a mechanical object can be a blade disk or comprise a blade disk and, in particular, a blade disk of a compressor stage of a turbine. In particular, a mechanical object can be a propeller or an impeller. However, a mechanical object can also be a musical instrument, in particular a percussion instrument, such as, for example, a tom-tom or a hi-hat.

Measurements can be produced, in particular, at a plurality of measurement points. Additionally or alternatively, redundant measurements, that is, measurements at one and the same measurement point, can also be made and can be undertaken several times. In principle, all measurement methods for determining a mechanical movement are suitable for this purpose, in particular position-based methods and/or force-based methods. Measurements can therefore be carried out, in particular, by position sensors, speed sensors, or acceleration sensors. Additionally or alternatively, measurements can also be carried out by force sensors, in particular by strain gauges, which are attached adhesively at the corresponding measurement points. Additionally or alternatively, movements and forces can also be detected with piezoelectric sensors. Also possible is a laser-based measurement, in particular, a laser vibrometer measurement, in order to carry out one or more measurements.

One or more parameters in which two or more and, in particular, all measurements or the measurement data associated therewith differ can be parameters of the mechanical object and/or parameters or the surroundings in which the mechanical object acts. Such surroundings can be, in particular, a machine in which the mechanical object is installed. When the mechanical object is a blade disk, a parameter for differentiation of the measurements can ensue, for example, from a turbine in which the blade disk is employed. One or more parameters for differentiation of the measurements can therefore be, in particular, the following: a position of the measurement point; another speed at which the mechanical object is driven when the measurement is carried out; another acceleration situation in which the mechanical object finds itself, such as, for example, a powering up or powering down of a turbine; an aerodynamic parameter, such as, for example, an aerodynamic pressure to which the mechanical object is exposed. For example, the mechanical object can relate to a blade disk or to a blade of a blade disk. It is then possible for a parameter that differentiates the measurements to ensue from a differently set angle of the blades that is adjusted during various measurements. It is also possible for a temperature of the mechanical object or of the surroundings of the mechanical object to be a parameter that is varied between various measurements. Obviously, it is also possible to vary a plurality of parameters during various measurements.

A spectrogram can be determined, in particular, by transforming the individual measurements into partial spectrograms in a preceding method step. The partial spectrograms are then fused in a subsequent step to create a composite spectrogram. Alternatively, a fusion of the measurement data can also be already made in the time domain and the fused data can be transformed together in a following step to create a spectrogram. In a further alternative, the measurement data of one or more measurements, but not all measurements, in the time domain can be fused and, on the basis thereof, a first partial spectrogram can be created. The remaining measurements can be transformed into individual further partial spectrograms and these partial spectrograms can then be fused to create a composite partial spectrogram. The partial spectrograms, which contain both data that has been fused in the time domain and data that has been fused in the frequency domain, can then be fused to create a composite spectrogram.

A predefined parameter, depending on which the spectrogram or the partial spectrograms is or are created, can be, in particular, an amplitude of the vibration at the corresponding frequency. In this case, the amplitude at a certain frequency of the various measurements or measurement data of individual measurements at a certain point is compared and then, for example, the maximum amplitude for the corresponding spectrogram is selected. In this case, the parameter need not necessarily relate to the maximum amplitude. Alternatively, it is also possible to select a minimum amplitude and accordingly to select the measurement for the composite spectrogram or a partial spectrogram fused from a plurality of measurements, this measurement exhibiting the smallest amplitude at a specific frequency and at a specific point in time or at a specific time-dependent parameter value. Alternatively, a parameter can also relate to an average value or a statistical value, such as, for example, a variance. In order to determine reference values at individual positions of the spectrogram, it is possible in some circumstances for an interpolation to be made between measurement data of individual measurements or of a plurality of measurements. This will be explained later in detail.

In particular, a determination of one or more excitations of the mechanical object can be already produced during the various measurements. In particular, it is also possible in this case for one or more interpolations to be made between various measurement data and/or spectrogram data in order to determine one or more changes. For example, by way of the measurement data in a partial spectrogram or in the composite spectrogram, it is possible for regions to be found in which one or more excitations have occurred during the measurement, in order to place the mechanical object in a dynamic state, said regions being identified and correspondingly linearly interpolated, so that the individual spectrogram values that belong to an excitation are joined by a straight line that passes through the origin of the spectrogram. This form is used, in particular, in the Campbell diagram.

A reproduction of the excitations in the spectrogram can comprise, in particular, a reproduction in a graphical user interface. Additionally or alternatively, such a reproduction can also be made on the basis of a corresponding look-up table. Additionally or alternatively, a reproduction of the excitations in the spectrogram can be model-based; that is, measurement data reproduced in the spectrogram and/or excitations reproduced in the spectrogram can be functionally modeled, so that they can be stored with less effort and can be correspondingly visualized, for example, by a graphical user interface.

An embodiment of the first aspect relates to a method, wherein the spectrogram is determined on the basis of a time or of a time-dependent value, in particular a rotational speed of the object or a rotational speed of a part of the object.

A rotational speed of the mechanical object can be, in particular, a rotational speed of a turbine in which the mechanical object moves when it represents a blade disk. In this case, the spectrogram is not reproduced over a time, but rather over this rotational speed, so that the plot of the frequency can be seen at various rotational speeds. In particular, a time or a time-dependent value can be reproduced nonlinearly and, in particular, portions that contain less interesting portions of the spectrogram can be reproduced with a lower resolution. Additionally and alternatively, portions can be reproduced with a higher resolution and, in particular, with a higher time or rotational speed resolution. Thus, it is possible to reproduce with a greater resolution measurement data that have interesting portions.

A reproduction in a spectrogram need not necessarily be a graphical reproduction. A reproduction can also comprise a reproduction in a computer memory, so that access can be had to the fused measurement information in accordance with the structure of a spectrogram.

An embodiment of the first aspect relates to a method comprising the step:
  reproduction of a prediction, in particular an analytical and/or stimulatory prediction, of a frequency or of a frequency domain of the mechanical object in the spectrogram.

It is possible, in particular, to superimpose further information on the composite spectrogram. This information can relate, for example, to natural frequencies of the mechanical object that are determined by analysis and/or by simulation. By way of a superimposition of natural frequencies determined by analysis or simulation, it is possible in the spectrogram to compare easily the natural frequencies of the mechanical object contained by the measurements with the natural frequencies determined by analysis or simulation. It is thereby possible, in particular, to detect measurement errors. A superimposition of information determined by analysis or by simulation can also relate to a partial spectrogram, in particular in order to identify regions of one partial spectrogram or a plurality of partial spectrograms comprising measurement data that need to be removed prior to the fusion creating the composite spectrogram. This can apply, for example, to measurement data for which a comparison between predictions determined by analysis or by simulation indicates that the measurement data are inferior. These data can then be removed in order to increase the quality of the fused spectrogram.

An embodiment of the first aspect relates to a method comprising the step:
  interpolating the measurement information on the basis of predefined reference points, in particular of a grid in the spectrogram.

In particular, for the fusion of partial spectrograms of individual measurement data or of a plurality of measurement data, it is possible for an interpolation of frequency-based and/or time-based information based on measurement data to be made. It is hereby possible, in particular, to project the measurement data of individual and/or of various measurements onto a common grid. This grid can have a very high resolution; that is, it can be very close-meshed. If individual measurement data or a plurality of measurement data provide no information at the grid points, then it is possible at the respective grid point to interpolate a corresponding measurement data point in the time domain or in the frequency domain.

An embodiment of the first aspect relates to a method comprising the steps:
  comparing the measurement results of the individual measurements at one reference point or at a plurality of reference points; and
  selecting a measurement result or fusing measurement results on the basis of the compared measurement results and on the basis of a predefined parameter.

It is then possible at the individual points to compare the interpolated or measured information of individual measurements with one another in order to carry out, as described, a selection from the measurement data to be compared on the basis of a predefined parameter. For example, it is possible to differentiate interpolated or measured information of various measurement data at a lattice point in terms of its maximum vibrational amplitude and, in accordance with the predefined parameter, to select the measurement for the composite/fused spectrogram that has the maximum vibrational amplitude.

An embodiment of the first aspect relates to a method comprising the step:
  displaying points and/or regions of the spectrogram on the basis of a predefined criterion.

In order to achieve a reduction in the complexity of the data reproduced in a composite spectrogram, it is possible to select certain regions or certain points in the spectrogram on the basis of a predefined criterion. In particular, such a predefined criterion can comprise one region or a plurality of regions in which a vibrational amplitude exceeds a specific threshold value. Additionally or alternatively, the region or the point with maximum vibrational amplitude that is reproduced in the spectrogram can be displayed. Such a display can already be produced by the display of the corresponding value. Additionally or alternatively, such a display can also comprise a colored marking and/or a marking by a superimposed geometric shape that surrounds the corresponding region or the corresponding point. The last-mentioned display possibilities are offered when the spectrogram is reproduced in a graphical user interface.

An embodiment of the first aspect relates to a method comprising the step:
  filtering one measurement result or a plurality of measurement results prior to the determination of the spectrogram.

A filtering of one measurement result or a plurality of measurement results can be made, in particular, in the case where the measurement results have inferior measurement information. In particular, it is possible to filter out those measurement results that influence too strongly the fused spectrogram. Additionally or alternatively, erroneous measurement information can be filtered out. A filtering can comprise both individual regions and individual points of individual measurements. Additionally or alternatively, a filtering can be applied to the entire measurement region of individual measurements or a plurality of measurements, such as, for example, a high-pass filtering and/or a low-pass filtering using a predefined filter. A high-pass filtering can be employed, for example, in order to filter out regions that do not especially differ from one another A low-pass filtering can be carried out, for example, in order to filter out regions that differ too strongly from other regions because, for example, they are based on erroneous sensor information.

An embodiment of the first aspect relates to a method comprising the steps:
  in particular, manual selection of a point and/or of a region of the spectrogram; and
  displaying measurement results on the basis of the point and/or region.

By way of the fusion of measurement data to create a partial spectrogram or to create a composite spectrogram depending on a predefined parameter, the measurement information of the individual measurements in the spectrogram is no longer reproduced. This problem can be solved by the selection of a point and/or of a region in the spectrogram that, for example, relates to a region and/or a point with a maximum vibrational amplitude in that the or those individual measurement data that are reproduced in the selected region or at the selected point are made accessible through the corresponding selection. For example, a point with a very high vibrational amplitude in the spectrogram can be selected and subsequently that measurement can be displayed together with measurement data in which this point was measured.

An embodiment of the first aspect relates to a method comprising the steps:
  selecting a region of the spectrogram; and
  carrying out a statistical analysis on the basis of the information in this region.

Selected regions can be subjected to one statistical analysis or to a plurality of statistical analyses. In particular, the statistical analyses can then be carried out on the basis of a plurality of measurement data that were reproduced in the corresponding region in the spectrogram. It is further possible, in particular when a graphical user interface is used, to use a corresponding switch to select or switch between various statistical analyses, so that the measurement information reproduced in the selected regions can be analyzed statistically. A statistical analysis can comprise, for example, a histogram analysis of the measurement data reproduced in the selected region. A statistical analysis can also comprise a maximum value analysis or a threshold value analysis or a mean value analysis that the data selected in the spectrogram are subject to.

An embodiment of the first aspect relates to a method, wherein the spectrogram is determined on the basis of an integral transform, in particular one of the following transforms:
  Fourier transform;
  sine transform;
  cosine transform;
  wavelet transform;
  chirplet transform.

In particular, it is possible to use various integral transforms in the method. For example, in one step, one set of measurement data or a plurality of measurement data (of one corresponding measurement or a plurality of corresponding measurements) can be transformed into a partial spectrum, initially using a specific integral transform, such as, for example, a Fourier transform. Other measurement data (of other measurements) can be transformed using integral transform into another partial spectrum and these two partial spectra can be fused in a following step to create a composite spectrogram. Likewise, it is possible, in particular when a graphical user interface is used for reproducing the spectrogram, to switch manually between various integral transforms, so that, depending on the selected integral transform, different analysis focuses are reproduced in the spectrogram.

An embodiment of the first aspect relates to a method comprising the step:
  displaying the spectrogram in a graphical user interface, in particular jointly together with one or more of the following features:

a predicted frequency or frequency domain or a plurality of predicted frequencies or frequency domains;

a common reference point or a plurality of common reference points and/or of the interpolated points;

a selected measurement result or a fused measurement result based on the compared measurement results;

points or regions that were determined on the basis of a predefined criterion;

filtered points or regions of the measurement results;

a result of a statistical analysis;

an integral transform used.

An embodiment of the first aspect relates to a method comprising the steps:

selecting one value or a plurality of values in the frequency domain and/or in the time-dependent domain of the spectrogram;

displaying a plot of the time-dependent domain at the selected point or points of the frequency domain and/or of the plot of the frequency domain at the selected value or values of the time-dependent domain.

Time-dependent information therefore also comprises a time.

A second aspect relates to a device, wherein the device is set up to implement the following steps:

carrying out multiple measurements on a mechanical object, the measurements each differing by one or more parameters influencing the measurement;

determining a spectrogram on the basis of the measurement data of the measurements and depending on a predefined parameter of the mechanical object;

determining one or more excitations of the mechanical object;

reproducing the excitations in the spectrogram.

An embodiment of the second aspect relates to a device, wherein the mechanical object comprises a blade disk, in particular a blade or a plurality of blades of a blade disk.

A third aspect relates to a graphical user interface (GUI), which is set up for the display and/or the configuration of an analysis of a movement behavior of a mechanical object according to the first aspect.

BRIEF DESCRIPTION OF THE FIGURES

Further advantages and features ensue from the following embodiments, which relate to the figures. The figures do not always show the embodiments in their true dimension. In particular, the dimensions of the various features may be correspondingly increased or reduced in size for clarity of the description. Shown for this purpose, partially in a schematic manner, are.

DESCRIPTION OF THE INVENTION

In the following descriptions, identical reference signs refer to identical or at least functionally equivalent features.

In the following description, reference is made to the attached drawings, which constitute a part of the disclosure and in which specific aspects whereby the present invention can be understood are shown for illustration. It is obvious that other aspects and/or features can be used and that functional, structural, or logical changes are possible, without leaving the scope of the present disclosure. The following detailed description is therefore not to be understood as limiting, because the scope of the present invention is defined by the appended claims.

In general, a disclosure about a described method also applies to a corresponding device in order to carry out the method or to a corresponding system that comprises one or more devices and vice versa. When, for example, a special method step is described, a corresponding device can comprise a feature in order to carry out the described method step, even when this feature is not explicitly described or depicted in the figure. When, on the other hand, for example, a special device is described on the basis of functional units, a corresponding method can comprise a step that the described functionality executes, even when such steps are not explicitly described or depicted in the figures. Likewise, a system can be furnished with corresponding apparatus features or with features in order to execute a specific method step. It is obvious that features of the various exemplary aspects described previously or below and embodiments can be combined with one another, unless explicitly stated otherwise.

Figure 1:
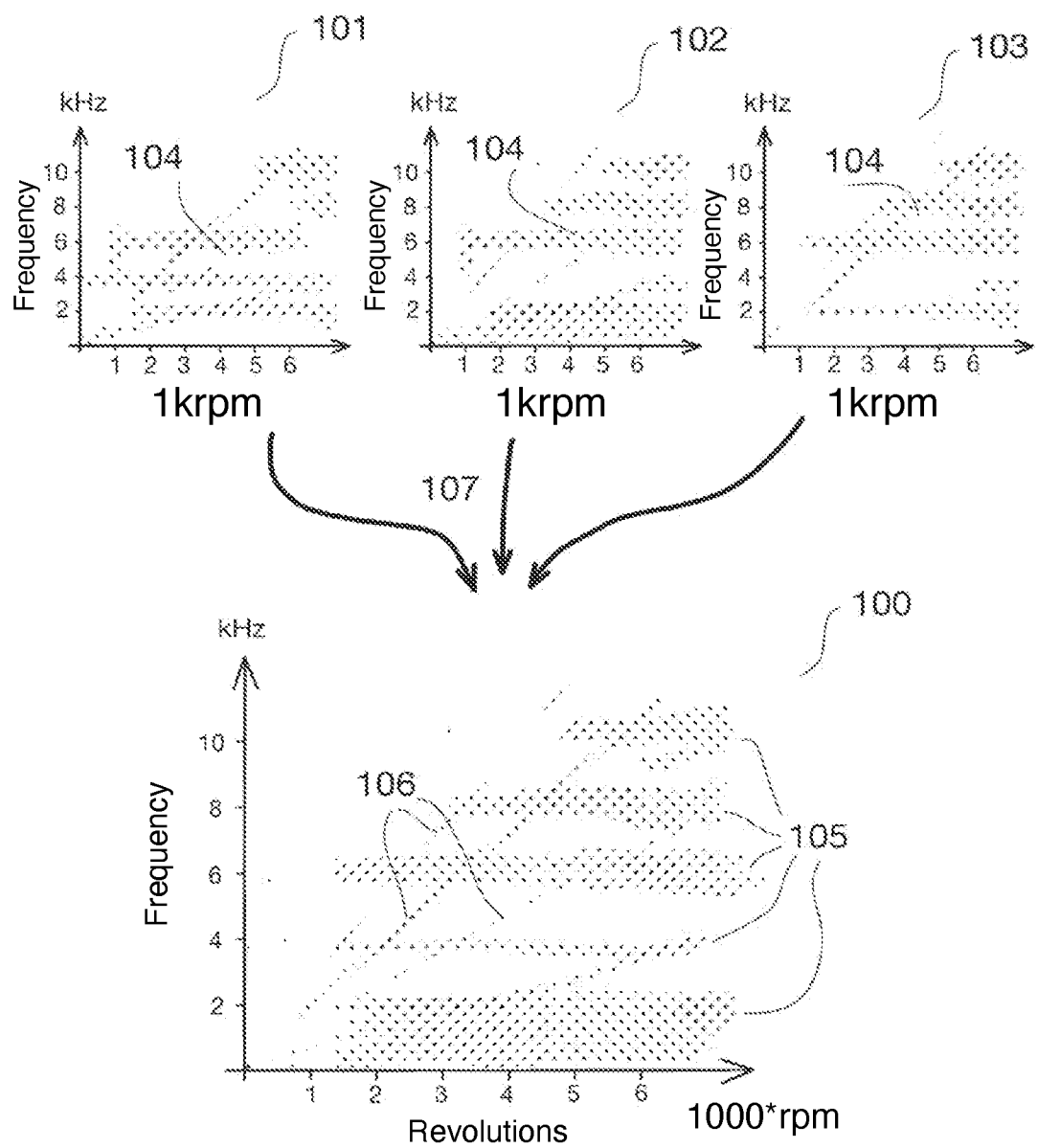
FIG. 1: a spectrogram for illustration of an analysis in accordance with a disclosed embodiment.

FIG. 1 shows a spectrogram for illustrating an analysis in accordance with a disclosed embodiment. The spectrogram 100 relates to a reproduction of the frequencies that are adjusted at a blade of a rotating blade disk in a turbine. Frequencies at the blade of 0 to approximately 10 kHz were thus measured. The frequencies are plotted in the spectrogram versus the rotations of the blade disk on which the blade is situated. The rotations can vary from 0 to approximately 7000 rotations/min. In the spectrogram 100, the fused measurement data 105, 106 are already represented. Reproduced here are regions 105 in which various natural frequencies or vibrational modes of the blades of the blade disk are found. Further represented are also the excitations that were detected by measurement techniques. These excitations can ensue, for example, from the aerodynamic influences that a blade exerts on the blade disk in each instance. The fused spectrogram 100 ensues from three measurements 107 that were carried out and are represented by the partial spectrograms 101, 102, and 103. The points 104 that are reproduced in the partial spectrograms represent the detected measurement signals after a short-time Fourier transform.

Figure 2:
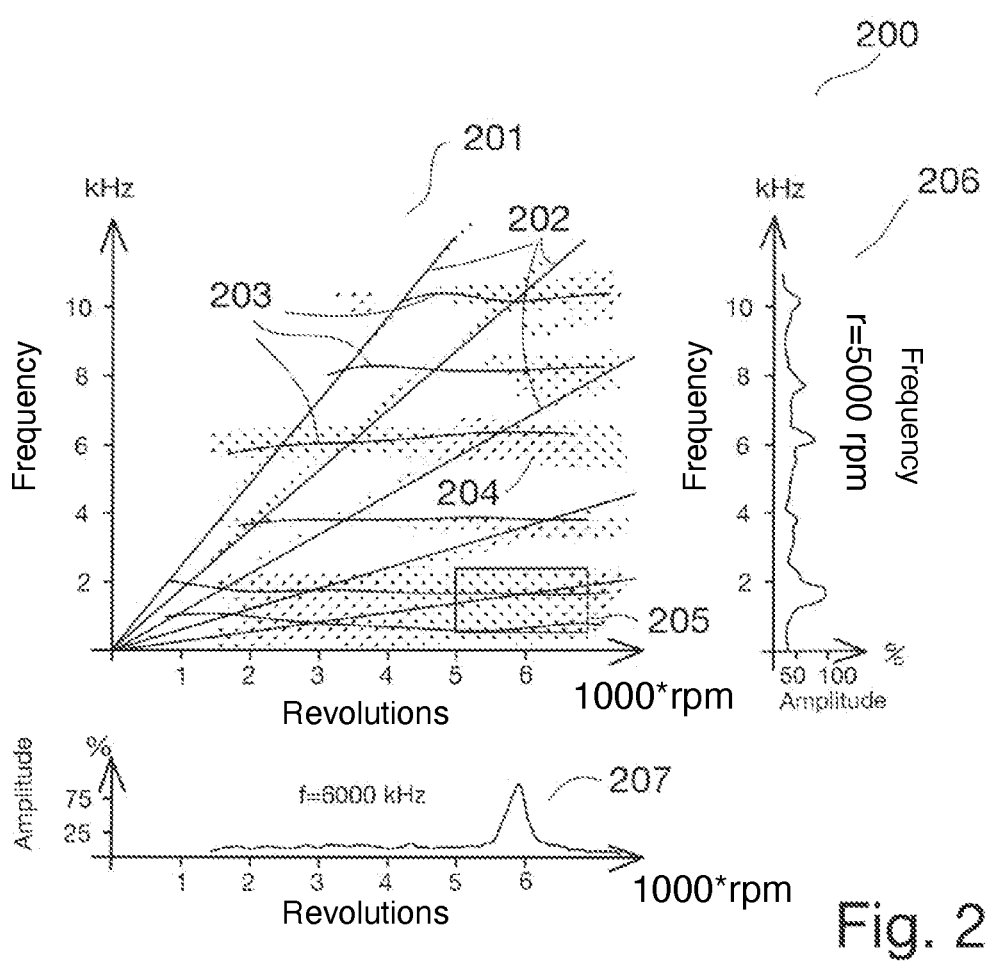
FIG. 2: another spectrogram for illustration of an analysis in accordance with a disclosed embodiment.

FIG. 2 relates to an expanded spectrogram 200 for illustration of an analysis in accordance with a disclosed embodiment. The spectrogram 201 relates to measurement data that were fused from various individual measurements (not depicted) and were reproduced as frequency representations over the rotations per minute adjusted in each instance. In addition to the spectrogram depicted in FIG. 1, the spectrogram 201 contains augmented information in regard to the natural frequencies and in regard to the excitations. Superimposed on the regions 105, in which various natural frequencies of the system are made clear by the measurement data, are analytically determined natural frequencies 203. In addition, analytically determined excitations 202 are superimposed on the excitations that were detected at least in part by measurement techniques, so that a quick comparison between the information determined by measurement techniques and fused information and the analytically calculated information in regard to the natural frequencies is possible. In addition, a region 205 was selected in which an especially critical natural frequency is presumed to exist. A further analysis can be achieved with the projections of the plot of the frequency as well as the plot of the amplitude. The diagram 207, which adjoins the spectrogram 201 in the lower region, discloses a plot of rotation. The rotation was assumed at a fixed frequency of 6000 Hz and shows a relative vibrational amplitude in relation to a previously analytically determined maximum vibrational value. The relative vibrational amplitude is plotted over the various rotations that the blade disk can assume. It is shown in this case that, in the region at just 6000 rotations per minute, an especially large vibrational amplitude emerges. Of necessity, this region must be damped using further measures if it should be reached or traveled through during operation of the turbine in order that, on account of the large vibrational amplitudes set there, an accelerated material fatigue of the blade disk does not ensue. A similar diagram is depicted bordering on the right side of the spectrogram by the diagram 206. Depicted there is a plot of frequency that was recorded at a rotational speed of 5000 rotations per minute. It shows various local maxima that are adjusted at the natural frequencies of the blades or of the blade disk. In addition to the measurement data or the analytical predictions of the natural frequencies reproduced in the spectrogram 201, it is possible in the projected diagram 206 to reproduce exactly the vibrational amplitudes that were measured previously also in regard to their absolute or relative value. This, too, leads to a rapid and flexible reproduction of the vibration behavior of the blades of the blade disk.

What is claimed is:

1. A method for analyzing a movement behavior of a mechanical object, comprising the steps of:
    carrying out multiple measurements of a mechanical movement, using position-based methods and/or force-based methods at a large number of measuring points on the mechanical object, the measurements of the mechanical movement each differing by one or more parameters influencing the measurements of a mechanical movement, wherein the one or more parameters includes a rotational speed of the mechanical object;
    wherein the mechanical object is a rotating blade disk mounted on a shaft;
    determining a first partial spectrogram on the basis of measurement data of the measurements of a mechanical movement and depending on a predefined parameter of the mechanical object for selection of the measurement data of the measurements;
    determining a second partial spectrogram on the basis of measurement data of the measurements of a mechanical movement and depending on a predefined parameter of the mechanical object for selection of the measurement data of a measurement;
    fusing the first partial spectrogram and the second partial spectrogram into a composite spectrogram;
    determining one or more excitations of the mechanical object; the excitations being maximum amplitudes for the spectrogram;
    displaying the excitations of the mechanical object in the composite spectrogram; and
    balancing the mechanical object.

2. The method for analyzing a movement behavior of a mechanical object according to claim 1, wherein the first or second partial spectrogram is determined on the basis of a time or of a time-dependent value of a rotational speed of the mechanical object or a rotational speed of a part of the mechanical object.

3. The method for analyzing a movement behavior of a mechanical object according to claim 1, further comprising the step of:
    production of an analytical prediction, of a frequency or of a frequency domain of the mechanical object in the first or second partial spectrogram.

4. The method for analyzing a movement behavior of a mechanical object according to claim 1, further comprising the step of:
    interpolating the measurement data on the basis of common reference points of a common grid in the first or second partial spectrogram.

5. The method for analyzing a movement behavior of a mechanical object according to claim 1, further comprising the steps of:
    comparing the measurement data of individual measurements at one or more reference points; and
    selecting a measurement result of the measurement data on the basis of compared measurement data and on the basis of an amplitude of a vibration at a corresponding frequency.

6. The method for analyzing a movement behavior of a mechanical object according to claim 1, further comprising the step of:
    displaying points and/or regions of the composite spectrogram on the basis of an amplitude of a vibration exceeding a threshold value.

7. The method for analyzing a movement behavior of a mechanical object according to claim 1, further comprising the step of:
    filtering one set of measurement data or a plurality of measurement data of one measurement or a plurality of measurements prior to determining the composite spectrogram.

8. The method for analyzing a movement behavior of a mechanical object according to claim 1, further comprising the steps of:
    in particular, manual selection of a point and/or region of the composite spectrogram; and
    displaying measurement data on the basis of the point and/or region.

9. The method for analyzing a movement behavior of a mechanical object according to claim 1, further comprising the steps of:
    selecting a region of the composite spectrogram; and
    carrying out a statistical analysis on the basis of measurement data in this region.

10. The method for analyzing a movement behavior of a mechanical object according to claim 1, wherein the first or second partial spectrogram is determined on the basis of an integral transform selected from the group consisting of Fourier transform, sine transform, cosine transform, wavelet transform, and chirplet transform.

11. The method for analyzing a movement behavior of a mechanical object according to claim 1, further comprising the step of:
    displaying the composite spectrogram in a graphical user interface together with one or more of the features selected from a group consisting of one or a plurality of predicted frequencies or frequency domains, one or more common reference points and/or of interpolated points, points or regions that were determined on the basis of a predefined criterion, filtered points or regions of the measurement data, a result of a statistical analysis, and an integral transform used.

12. The method for analyzing a movement behavior of a mechanical object according to claim 1, further comprising the steps of:
    selecting one or more values in a frequency domain and/or in a time-dependent domain of the first or second partial spectrogram;
    displaying a plot of the time-dependent domain at the selected value or values of the frequency domain and/or displaying a plot of the frequency domain at the selected value or values of the time-dependent domain.

13. A device for analyzing a movement behavior of a mechanical object, wherein the device is configured and arranged for implementing the following steps:
- carrying out multiple measurements of a mechanical movement, using position-based methods and/or force-based methods at a large number of measuring points on the mechanical object, the measurements each differing by one or more parameters influencing the measurements; Wherein the one or more parameters includes a rotational speed of the mechanical object;

wherein the mechanical object is a rotating blade disk mounted on a shaft;
- determining a first partial spectrogram on the basis of measurement data of the measurements and depending on a predefined parameter of the mechanical object;
- determining a second partial spectrogram on the basis of measurement data of the measurements and depending on a predefined parameter of the mechanical object;
- fusing the first partial spectrogram and the second partial spectrogram into a composite spectrogram;
- determining one or more excitations of the mechanical object; the excitations being maximum amplitudes for the spectrogram;
- displaying the excitations in the composite spectrogram; and
- balancing the mechanical object.

* * * * *